(12) United States Patent
Zhou

(10) Patent No.: US 7,378,027 B2
(45) Date of Patent: May 27, 2008

(54) MULTILAYER ENERGY DISSIPATING INLET COLUMN IN CENTER-FEED CLARIFIERS

(76) Inventor: Siping Zhou, 7318 38th Ave. NE., Seattle, WA (US) 98115

( * ) Notice: Subject to any disclaimer, the term of this patent is extended or adjusted under 35 U.S.C. 154(b) by 78 days.

(21) Appl. No.: 11/373,749

(22) Filed: Mar. 9, 2006

(65) Prior Publication Data

US 2007/0209996 A1    Sep. 13, 2007

(51) Int. Cl.
*B01D 21/24* (2006.01)
(52) U.S. Cl. ............... 210/801; 210/519; 210/520; 210/528
(58) Field of Classification Search ............ 210/519, 210/520, 528, 541, 800, 801
See application file for complete search history.

(56) References Cited

U.S. PATENT DOCUMENTS

| 1,887,177 | A | * | 11/1932 | Adams | 210/519 |
| 2,140,059 | A | * | 12/1938 | Simonsen | 210/109 |
| 2,205,199 | A | * | 6/1940 | Hubbell et al. | 210/520 |
| 3,539,051 | A | * | 11/1970 | Stone | 210/520 |
| 3,770,131 | A | * | 11/1973 | Davis et al. | 210/519 |
| 3,926,805 | A | * | 12/1975 | Walker | 210/519 |
| 4,193,877 | A | * | 3/1980 | Lillywhite | 210/520 |
| 6,099,743 | A | * | 8/2000 | Pedersen | 210/528 |
| 6,276,537 | B1 | * | 8/2001 | Esler et al. | 210/519 |
| 6,736,275 | B2 | * | 5/2004 | Schneider et al. | 210/519 |
| 6,800,209 | B2 | * | 10/2004 | Wright | 210/528 |
| 2005/0252868 | A1 | * | 11/2005 | Albertson | 210/519 |

* cited by examiner

*Primary Examiner*—Christopher Upton

(57) ABSTRACT

The Multilayer Energy Dissipating Inlet Column (MEDIC) in a center-feed clarifier consists of a plurality of perforated and concentric columns and a circular cover, which closes the bottom of the multilayer column. In the wall of each perforated column many flow inlet ports are mounted. The layout of the flow inlet ports between any two adjacent perforated columns is staggered to create a puzzled flow path and flow impingement among the layers of MEDIC. The strong influent jet due to the small inifluent area in a center-feed clarifier continuously impinges with the multilayer perforated columns one after another one. The resistance created by the multiple perforated columns slows down the influent jet and evenly distributes it among all of the inlet ports in the wall of the most outside column. The ability of MEDIC to confine the turbulence entering into clarifiers effectively lowers the dispersed sludge blanket in clarifiers and increases their capacity.

20 Claims, 6 Drawing Sheets

MULTILAYER ENERGY DISSIPATING INLET COLUMN IN CENTER-FEED CLARIFIERS

REFERENCES

U.S. Pat. No. 6,276,537 Aug. 21, 2001 Esler et al 210/519
U.S. Pat. No. 6,800,209 Oct. 5, 2004 Wright 210/801

FIELD OF THE INVENTION

Clarifiers are tanks where solids-liquid separation occurs due to gravity. They are used in nearly every wastewater or sewage treatment plant. This invention presents an apparatus and method for energy dissipating of clarifier influent.

BACKGROUND OF INVENTION

Clarifiers are an integral part of the activated sludge process—crucial components that often determine the success or failure of the entire treatment system.

The performance and capacity of a center-feed clarifier is very sensitive to the intensity of influent jets entering into the clarifiers. A center-feed clarifier naturally generates a strong influent jet due to its small center-feed area in a circular clarifier tank as shown in FIG. 1. The intensive center influent often brings significant turbulence into the settling compartment, especially under high flow conditions. To enhance the hydraulic efficiency and capacity of center-feed clarifiers, one of the most important key issues is to develop a center-feed apparatus, which could be used to effectively reduce the intensity of the central influent jet and turbulence under high-flow conditions.

Various types of energy dissipating devices have been developed for dissipating the energy of the influent entering into a flocculation well in the center-feed clarifiers. As shown in FIG. 2, the traditional Energy Dissipating Inlet (EDI) has often been used in many recent clarifier designs with the center-feed structure in order to dissipate the clarifier inlet energy. Using the traditional EDI shown in FIG. 2, the jet of clarifier influent flow through a few influent ports is still very strong due to the small cross sectional area of the ports, especially in a large clarifier and under high flow conditions. If the cross sectional area of the inlet ports is simply enlarged, flow short-circuiting (or unevenly distributed flow) may occur among the ports due primarily to the insufficient resistance along the radius.

An apparatus with similar principle but different flow controls was also invented by Write (U.S. Pat. No. 6,800,209, Oct. 5, 2004). His EDI has a single layer column centered in the clarifier and closed at the bottom. Ports in the wall of the column are each equipped with a pair of hinged gates on the sides of the center vane and a bottom baffle underlying the port. The gates can direct the influent flows in opposite tangential directions from each port into impingement.

Esler et al. invented an energy dissipating devise (U.S. Pat. No. 6,276,537) which is consists of a single layer column and closed at the bottom. His EDI is equipped with pipes that extend from the bottom of the column and direct the flow that discharges from the EDI in opposite directions. The strong influent jet impingement occurs either outside the wall of the EDI (Write, 2004) or underneath the bottom of the EDI (Esler, et al., 2001).

The turbulence in clarifiers must be lowered in order to control the dispersed sludge blanket. Any EDI alternatives having either the intensive inlet jets or the strong flow impingement among the jets occurred outside the EDI column may not be able to effectively confine the turbulence entering into clarifiers.

To produce satisfactory hydraulic behavior, one of the necessary design conditions is that the cumulative space of the inlet ports of an EDI must be big enough. However, this condition alone is not sufficient to guarantee a low momentum entering into the clarifiers.

An optimized design of clarifier inlet structure should simultaneously satisfy both the working principles, i.e. a large accumulative space of inlet ports and a uniform flow distribution among the inlet ports in the outside wall of EDI. An innovative "Multilayer Energy Dissipating Inlet Column" (MEDIC) could be used as an effective solution to the problem of strong center-feed jets.

SUMMARY OF THE INVENTION

Major Structure and Working Principle of Multilayer Energy Dissipating Inlet Column As shown in FIGS. 3 and 4, the Multilayer Energy Dissipating Inlet Column (MEDIC) consists of the following 3 major components:

1. A center influent pipe, which has several flow influent ports in the wall of the pipe located between sludge blanket and clarifier liquid surface;
2. A plurality of perforated and concentric columns;
3. A circular cover, which closes the bottom of the multilayer column.

Each of the perforated and concentric columns has different radii. In the wall of each perforated column many flow inlet ports are mounted for flow going through. The layout of the flow inlet ports between any two adjacent perforated columns must be staggered along both the tangential and vertical direction (see FIG. 3) or otherwise staggered along at least one direction of them (see FIG. 4) in order to create a puzzled flow path and flow impingement on each layer of the MEDIC. A circular cover closes the bottom of the multilayer column and the small drainage holes are distributed on the bottom cover.

The number and shape of the inlet ports can vary for each layer of the MEDIC. The cumulative space of the ports on each layer of the MEDIC can be either a constant or variable. The radius difference(s) between two adjacent perforated columns can be a constant or variable.

Comparison of MEDIC with Conventional EDI

FIG. 6 presents comparison of the Computational Fluid Dynamic (CFD) modeling results for flow and solids fields between the center-feed clarifier described in FIG. 1, in which there is no energy dissipating apparatus around the vertical center-feed pipe, and one equipped with a MEDIC.

In the modeling study, the MEDIC equipped with three perforated layers is applied. More than 3 perforated layers could be applied for a prototype of the MEDIC in order to guarantee a uniform flow distribution entering the clarifiers.

FIGS. 6(a) and 6(b) present the velocity and solids fields in a selected vertical slice of the tested clarifiers. In the model predicted velocity fields, each velocity vector originates at a grid point used in the CFD model. The length of each vector is proportional to the magnitude of the velocity determined by the model for the corresponding grid point, and is in accordance with the 3.0 cm/s scale indicated in the figures. The figures also present the simulated solids fields in an identical vertical section of the model. In this figure the contour lines with interval of 100 mg/L indicates the Suspended Solids concentration.

In a center-feed clarifier, it is not very easy to enforce flow evenly entering the clarifier along the rim of an energy dissipating column unless enough resistance along the radial direction can be created within the device. However, the high resistance along the radial direction can not be generated through simply reducing the size or number of the inlet ports, which would increase the flow intensity entering into the clarifiers. The MEDIC is able to simultaneously satisfy both of the energy dissipating principles, i.e. a large accumulative space of inlet ports and a uniform flow distribution among all of the inlet ports due to the multilayer flow impingement (see FIG. 6).

DETAILED DESCRIPTION

Figure 1:
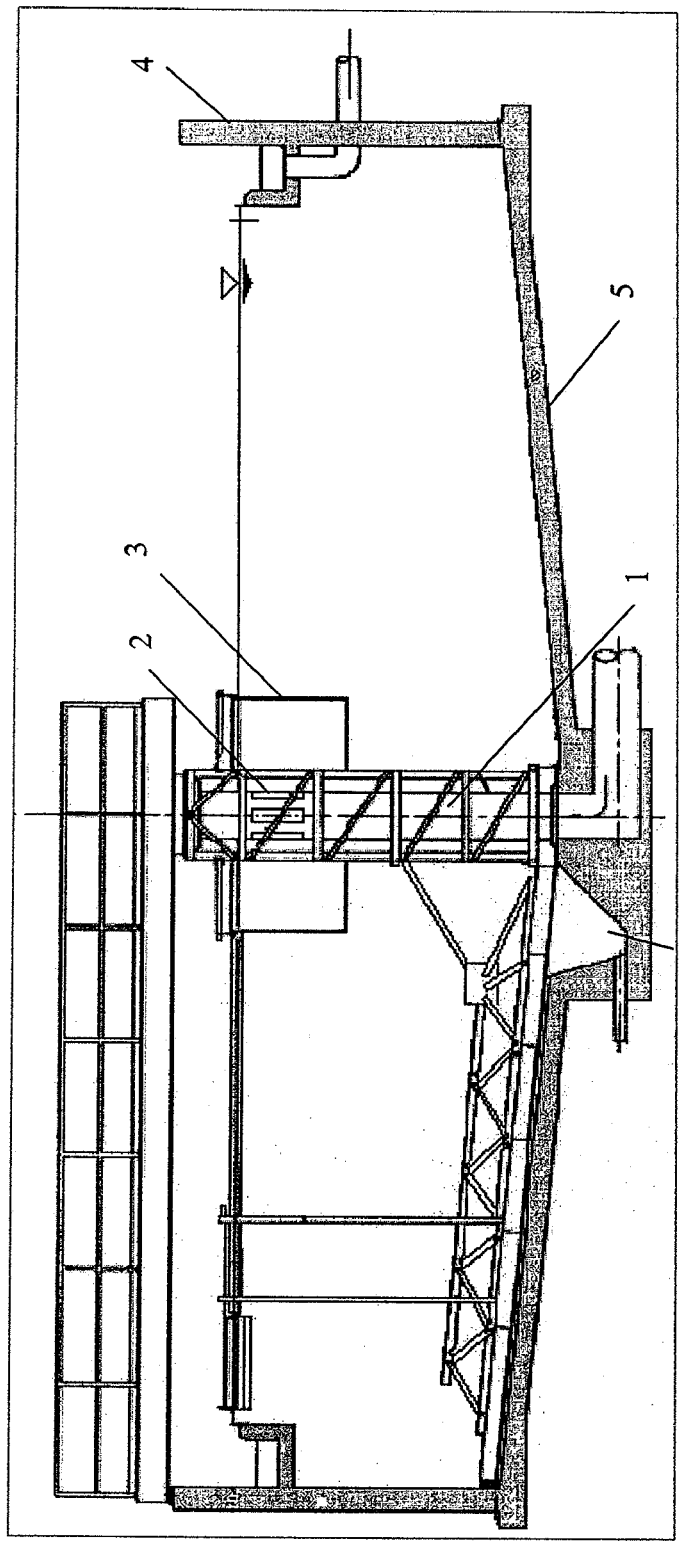
FIG. 1 is a cross-section of a circular clarifier equipped with a center influent pipe and flocculation well.

FIG. 1 shows a typical clarifier with a center influent pipe [1] equipped with rotational sludge scrapers. Several inlet ports [2] are located near the top end of the center influent pipe. A flocculation well [3] surrounds the center influent pipe [1] to provide better mixing and flocculation of clarifier influent liquid. The clarifier tank has a normally inclined tank bottom [4] of concrete or metal construction. A peripheral effluent weir on the clarifier side-wall [5] (or launder not shown) is provided to collect clarifier effluent. The settled sludge is collected into the center sludge hopper [5A] and removed.

Figure 2:
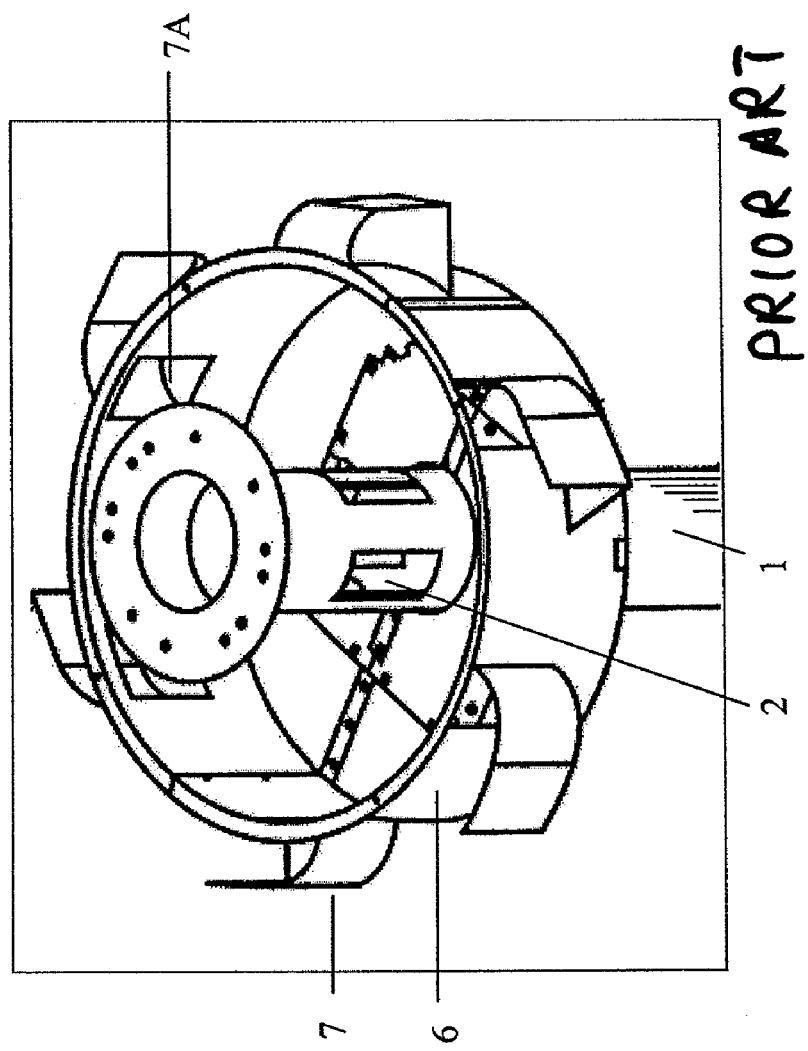
FIG. 2 is a schematic top view of a center influent pipe surrounded by a traditional Energy Dissipating Inlet (EDI).

FIG. 2 shows a center influent pipe [1] surrounded by a traditional EDI [6]. The clarifier influent flow is introduced into the EDI [6] first through the center influent pipe [1] and the inlet ports [2] mounted near the top end of the pipe. The clarifier influent flow further enters the flocculation well [3] through the ports [7A] mounted on the side-wall of the EDI [6]. In front of each of the inlet ports [7A] a small curved flow redirection baffle [7] is installed to guide the inlet flow jet toward to tangential direction of the EDI rim.

Figure 3:
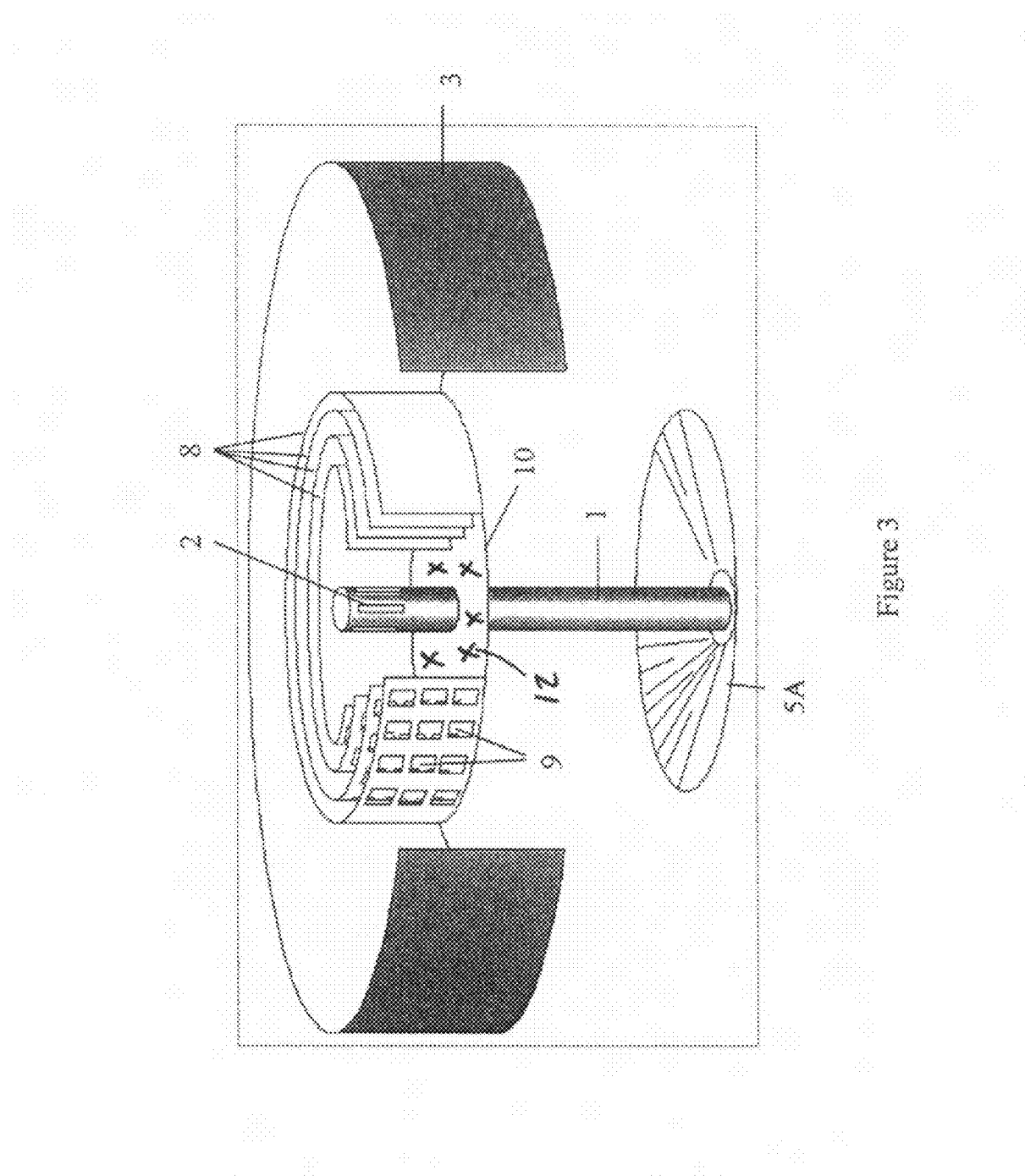
FIG. 3 is a partial cross-section view of a center influent pipe equipped with a Multilayer Energy Dissipating Inlet Column (MEDIC) in center-feed clarifiers

FIG. 3 describes a center influent pipe [1] equipped with a Multilayer Energy Dissipating Inlet Column (MEDIC) [8] in the center-feed clarifiers. The clarifier influent flow is introduced into the MEDIC [8] first through the center influent pipe [1] and the inlet ports [2] mounted near the top end of the pipe. Before entering the flocculation well [3], the clarifier influent flow has to go through many inlet ports [9] mounted in each layer of the MEDIC. The layout of the flow inlet ports [9] between any two adjacent perforated columns [8] is staggered along both the tangential and vertical direction to create a puzzled flow path. A circular cover [10] closes the bottom of the multilayer column to protect the sludge hopper [5A] from the influent dilution and prevent flow short circuiting between the inlet ports [2] and flocculation well [3]. The small drainage holes 12 (indicated by "x" markings, which indicate the existence of the drainage holes 12 in the bottom cover 10 but are not meant to convey any attribute (such as shapes and sizes) of the holes) are distributed on the bottom cover [10] of MEDIC.

Figure 4:
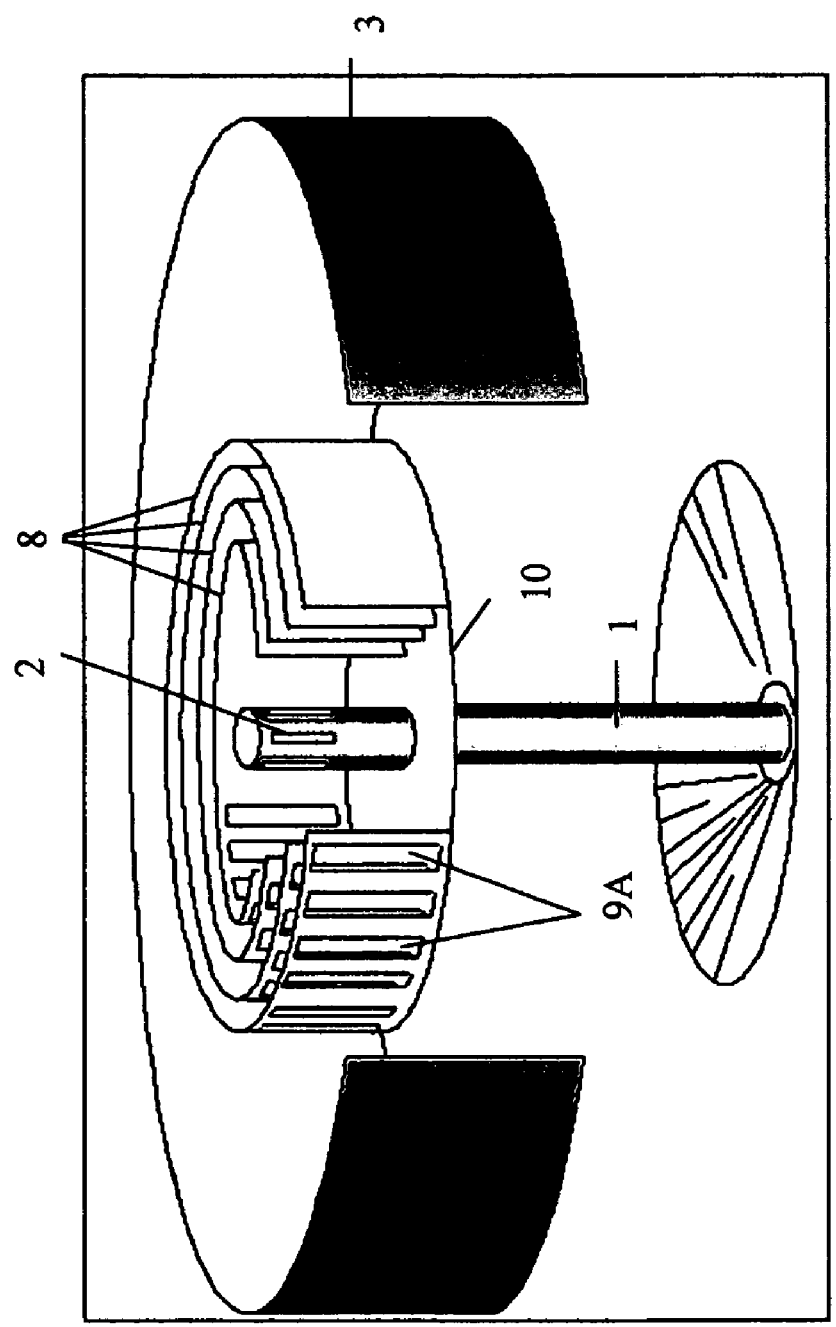
FIG. 4 is a partial cross-section view of an alternative of this invention

FIG. 4 shows an alternative of the MEDIC. The clarifier influent flow is introduced into the MEDIC [8] first through the center influent pipe [1] and the inlet ports [2] mounted near the top end of the pipe. Prior to entering the flocculation well [3], the center influent flow goes through many inlet ports [9A] mounted in each layer of the MEDIC [8]. The layout of the flow inlet ports [9A] between any two adjacent perforated columns [8] is staggered along the tangential direction to create the puzzled flow path among the perforated layers [8]. A circular bottom cover [10] closes the bottom of the multilayer column.

Figure 5:
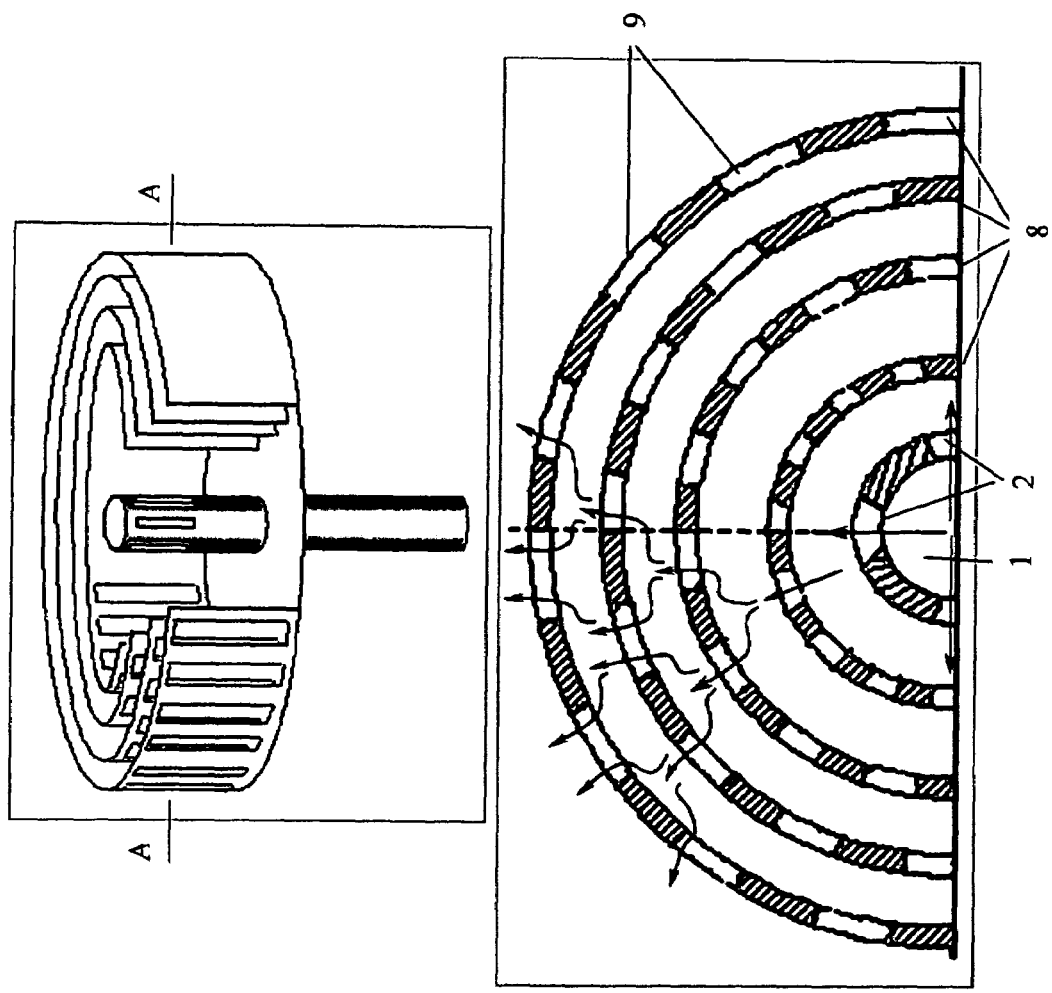
FIG. 5 is a partial top-section view of MEDIC taken on the level A-A

FIG. 5 shows a partial top-section view of MEDIC taken on the level A-A. The clarifier influent flow enters the MEDIC through the center feed pipe [1] and the inlet ports [2]. The influent flow keeps hitting the multilayer perforated columns [8] and splitting among the staggered ports [9] between two adjacent layers [8].

Figure 6:
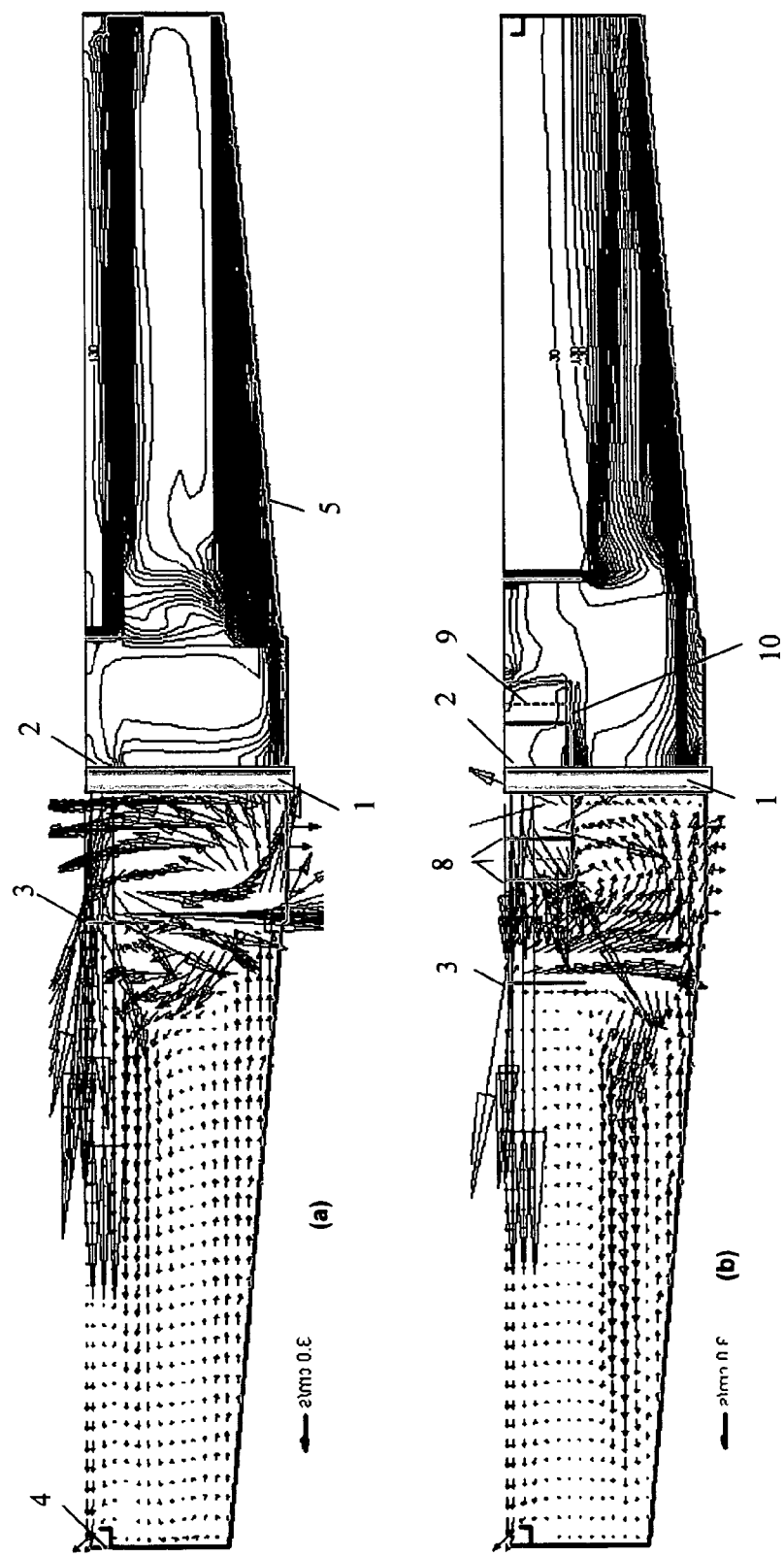
FIG. 6 is a cross-section view showing the Computational Fluid Dynamic (CFD) model predicted impact of the MEDIC on solids and flow fields in the center-feed clarifiers.

FIG. 6 consists of the two parts of 6(a) and 6(b) with respect to the two tested clarifiers with and with no the MEDIC, respectively. As shown in FIG. 6(a), the CFD modeling results for the clarifier equipped with a simple center influent pipe indicate:

1. The strong influent jet through the inlet ports [2] penetrates the entire radius of the flocculation well [3] and impinges on the inner side of the well [3] due to the lack of effective momentum/energy dissipating facilities within the flocculation well. After impinging on the flocculation well, the influent flow deflects and forms a very strong downward current toward the sludge blanket and clarifier floor [5].
2. Significant reverse flow is predicted underneath the strong surface influent jet due to the shears between them.
3. A pinched clarifier influent flow under the baffle lip [3] can be observed due to the massive sludge inventory in the clarifier. The density forward current is much closer to the water surface than that predicted under a lower flow condition due to the buoyancy impact of the thick sludge blanket.

As shown in FIG. 6(b), the modeling results for the clarifier equipped with a MEDIC [8] indicate:

1. The strong influent jet due to the small influent ports [2] continuously impinges with the multilayer perforated columns [8] one after one. The velocities of the influent jets have been substantially reduced before and after going through the ports [9] in the last perforated layer [8]. The resistance created by the multiple perforated columns [8] forces the influent jet to be sufficiently distributed along the vertical and tangential directions before it enters into the flocculation well [3].
2. The downward current due to the deflection of the influent jet on the flocculation well [3] has been significantly reduced, since the momentum of the influent jet is effectively dissipated by applying the MEDIC. The circular bottom [10] forces all of the influent flow going through the staggered ports [9] and prevents flow short circuiting between the inlet ports [2] and flocculation well [3].
3. The pinched flow underneath the lip of the baffle (flocculation well) [3] has been eliminated and the level of density forward current is much closer to the clarifier floor [5] due to the lowered turbulence and the well controlled dispersed sludge blanket in the clarifier.

4. The significant reverse flow underneath the surface influent jet predicted in the existing clarifiers has been almost eliminated, since the significantly slowed influent jet generates a much weaker shear influence on the ambient flow.

What is claimed is:

1. An inlet energy dissipating device, comprising
a clarifier tank having a center influent pipe adapted to introduce a sludge-containing fluid into the tank, the tank further comprising a side wall and a tank floor to contain the sludge-containing fluid and an effluent outlet located in an upper portion of the tank;
an energy dissipating inlet (EDI) comprising a plurality of laterally nested columns positioned within an upper portion of the clarifier tank and surrounding the center influent pipe, each of the plurality of columns having a plurality of ports for releasing the sludge-containing fluid into clarifier tank;
the effluent outlet being located outside the energy dissipating inlet;
a bottom covering the bottom of the plurality of columns and located in the upper portion of the clarifier tank.

2. The inlet energy dissipating device of claim 1, wherein each column comprises a wall, and the ports are formed in the wall.

3. The inlet energy dissipating device of claim 2, wherein the ports are staggered between two adjacent columns along a direction tangential to the wall or a vertical directions, or both.

4. The inlet energy dissipating device of claim 2, wherein the ports have different shapes between at least two of the plurality of columns.

5. The inlet energy dissipating device of claim 2, wherein each of the plurality of columns has the same number of the ports.

6. The inlet energy dissipating device of claim 2, wherein the each of the plurality of columns has a cumulative space of the ports in that column, and the cumulative space for the plurality of columns is substantially the same.

7. The inlet energy dissipating device of claim 1, wherein each pair of adjacent columns are separated by a spacing, and at least two pairs of the plurality of columns have different spacings.

8. The energy dissipating device of claim 1, wherein the bottom cover defines at least one drainage hole.

9. The inlet energy dissipating device of claim 1, wherein plurality of columns are concentric and centered at the center influent pipe.

10. The inlet energy dissipating device of claim 9, wherein at least one of the plurality columns is rotatable around the center influent pipe.

11. The inlet energy dissipating device of claim 10, wherein the columns are rotatable at different rotational speeds from each other.

12. The inlet energy dissipating device of claim 10, wherein each column comprises a wall, and the ports are defined in the wall.

13. The inlet energy dissipating device of claim 1, wherein the energy dissipating inlet further comprises a flocculation wall inside the side wall of the clarification tank and laterally surrounding the columns.

14. The inlet energy dissipating device of claim 1, further comprising a sludge outlet at a lower portion of the clarification tank.

15. A method of clarifying a sludge-containing liquid, the method comprising:
passing the sludge-containing liquid into a clarification tank through an into a center influent pipe;
continuously impinging the sludge-containing liquid on a plurality of layers of walls of an energy dissipating inlet (EDI) surrounding the center influent pipe to lower flow intensity outwardly from the center influent pipe, the walls forming a plurality of laterally nested columns positioned within an upper portion of the clarifier tank, each of the plurality of columns having a plurality of ports for releasing the sludge-containing fluid into clarifier tank, EDI further comprising a bottom covering the bottom of the plurality of columns and located in the upper portion of the clarifier tank; and
discharging the clarified liquid from an upper portion of the clarification tank.

16. The method of claim 15, further comprising impinging the sludge-containing liquid on a wall of a flocculation well surrounding the energy dissipation column located inside the clarification tank.

17. The method of claim 16, wherein impinging the sludge-containing liquid on a plurality of layers of walls of a energy dissipating column comprises passing the sludge-containing liquid through a plurality of ports defined in each of the plurality of layers of walls.

18. The method of claim 17, wherein passing the sludge-containing liquid through a plurality of ports defined in each of the plurality of layers of walls comprises passing the sludge-containing liquid through ports that are staggered between two adjacent layers of walls along a direction tangential to the walls or a vertical direction, or both.

19. The method of claim 16, where impinging the sludge-containing liquid on a plurality of layers of walls of a energy dissipating column comprises impinging the sludge-containing liquid on a plurality of concentric layers of walls of a energy dissipating column.

20. The method of claim 19, further comprising rotating at least one of the layers of walls around the center influent pipe.

* * * * *